United States Patent
Pearce et al.

(10) Patent No.: US 8,633,382 B2
(45) Date of Patent: Jan. 21, 2014

(54) CABLE JOINT

(75) Inventors: David Pearce, Wootton Bassett (GB); Richard Pardoe, East Grinstead (GB)

(73) Assignee: Tyco Electronics UK Ltd., Wiltshire (GB)

( * ) Notice: Subject to any disclaimer, the term of this patent is extended or adjusted under 35 U.S.C. 154(b) by 832 days.

(21) Appl. No.: 12/141,686

(22) Filed: Jun. 18, 2008

(65) Prior Publication Data

US 2008/0314617 A1    Dec. 25, 2008

(30) Foreign Application Priority Data

Jun. 20, 2007   (GB) .................................. 0711924.1

(51) Int. Cl.
*H02G 15/24* (2006.01)

(52) U.S. Cl.
USPC ....................................................... 174/22 C

(58) Field of Classification Search
USPC ................ 174/22 C, 25 R, 22 R, 93
See application file for complete search history.

(56) References Cited

U.S. PATENT DOCUMENTS

| | | | |
|---|---|---|---|
| 4,685,981 A | 8/1987 | Dienes | |
| 4,695,676 A | 9/1987 | Lawrence et al. | |
| 4,740,653 A | 4/1988 | Hellbusch | |

FOREIGN PATENT DOCUMENTS

| | | |
|---|---|---|
| EP | 0196767 A3 | 10/1986 |
| GB | 485613 | 5/1938 |
| GB | 508036 | 6/1939 |
| GB | 1159202 | 7/1969 |
| GB | 1419860 | 12/1975 |
| GB | 2173052 A | 10/1986 |

*Primary Examiner* — Chau Nguyen
(74) *Attorney, Agent, or Firm* — Barley Snyder

(57) ABSTRACT

A joint for a paper-insulated lead covered cable (PILC) including paper insulation impregnated with oil, the joint comprising a first PILC and a retaining jacket having a hollow interior, the first PILC having an inner conducting element that is conductively secured to an inner conducting element of a further cable within the hollow interior of the retaining jacket, the joint further comprising a sealant forming a sealant layer within the hollow interior of the retaining jacket and a retaining structure positioned within the sealant layer.

16 Claims, 4 Drawing Sheets

CABLE JOINT

CROSS-REFERENCE TO RELATED APPLICATIONS

This application claims the benefit of the filing date under 35 U.S.C. §119(a)-(d) of German Patent Application No. GB 0711924.1, filed Jun. 20, 2007.

FIELD OF THE INVENTION

This invention relates to a cable joint, especially of the kind intended for splicing together two cables at least one of which is of the paper-insulated lead covered cable (herein "PILC") type. A PILC typically finds application in the transmission of electric current at so-called "medium" voltages in the approximate range 10 KV to 42 KV

BACKGROUND

In this type of cable, an inner conducting core made, for example, of twisted strands of a conducting metal is surrounded along the length of the cable by a cylindrical layer of paper that is impregnated with an oil. This layer is in turn surrounded along the length of the cable by a lead (or other conducting material) jacket or sleeve. The impregnated paper layer acts as a dielectric that insulates the inner conductor from the outer (conductive) jacket.

PILC's are rarely manufactured nowadays, but many tens of thousands of metres of the cable type remain in service around the world. Therefore there remains a need for connecting PILC's together, and for connecting PILC's to other types of cable.

One characteristic of a PILC is that if migration of the oil occurs, the dielectric effect of the impregnated paper diminishes dramatically as the paper dries out. Generally this migration effect does not occur over the length of cable that lies away from the cable ends, but when it is required to splice an end of a PILC a potential problem arises in that there exist leakage paths for the oil.

In addition, oil may also affect the mechanical performance of many polymers and so must be prevented from coming into contact with any such polymers, for instance, the polymeric insulation of modern power cables or other polymeric parts in a cable joint, in particular polymeric parts that have conductive properties.

Prior art designs of cable joint for use with PILC's have sought to close off such leakage paths. This aim may be realized through the use of a rigid casing, of the kind described in GB-A-1 485 613, that encloses a joint assembly including various seals. The objective of including the seals is to prevent deleterious migration of the oil from the paper layer.

The arrangement of GB-A-1 485 613 however is complicated. Aside from the fact that this makes the joint expensive to manufacture, assembly of the joint is a lengthy process, the steps of which must be completed in the correct order in order to assure leak-proofing of the joint. If the joint is assembled in a "field" situation by an inexperienced fitter therefore, there is a danger of the steps not being completed correctly or in the correct order, such that the joint fails in service. Similarly if even one of the many components of the GB-A-1 485 613 joint becomes lost or damaged the integrity of the joint is compromised.

Yet a further problem with the joint of GB-A-1 485 613 is that it does not seek to address the problems that can arise when the heating effect of electrical resistance in the cable of a PILC causes expansion of the oil of the impregnated paper.

Under such circumstances the pressure of oil within a joint can rise sufficiently that the oil is forced to leak away, thereby reducing the dielectric effect as aforesaid.

High oil pressures can also arise when the cable containing the joint lies, for example, on a hillside. The hydraulic head of oil above the joint can then be adequate to promote the above-described migration of oil.

Known cable joints may generally comprise an oil barrier tube which may be in the form of, for example, a rigid casing which is used in conjunction with a sealing mastic. Under fault conditions, the cable temperature can increase significantly leading to a large increase in oil pressure. A problem with known cable joints of this type is that they are not able to withstand such increases in oil pressure.

Experiments have shown that sealing mastic deforms when exposed to high air pressures. Under such conditions, voids having a generally "teardrop" shape, begin to form as the air pressure forces a path through the mastic. The voids propagate, eventually forming pathways through the mastic.

FIG. 1 illustrates schematically the approximate shape of voids formed in mastic when the mastic is subjected to high air pressure. The higher the pressure the more quickly the voids will form. At a pressure of 5 bar, voids may form very quickly, whereas at a pressure of 3 bar, voids are unlikely to form, or may form very slowly.

It is understood by those skilled in the art that a similar deformation will take place when mastic is subjected to high oil pressure. Sufficiently high oil pressure for void formation is likely to occur under heavy loading or fault conditions. Under such conditions the voids formed are likely to be relatively wider than those shown in FIG. 1.

In known cable joints comprising an oil barrier tube used in conjunction with a sealing mastic, voids formed in the mastic may propagate through the mastic when the oil pressure within a joint rises significantly. As the voids propagate, they form pathways providing means for oil to pass through the mastic and hence leak from the cable.

SUMMARY

According to a first aspect of the present invention, there is provided a joint for a paper-insulated lead covered cable (PILC) including paper insulation impregnated with oil, the joint comprising a first PILC and a retaining jacket having a hollow interior, the first PILC having an inner conducting element that is conductively secured to an inner conducting element of a further cable within the hollow interior of the retaining jacket, the joint further comprising a sealant forming a sealant layer within the hollow interior of the retaining jacket and a retaining structure positioned within the sealant layer.

The further cable may comprise any type of medium voltage cable and may, for example, be another PILC.

The sealant layer surrounds both the inner conducting elements such that the vicinity in which the two conducting elements contact one another is covered and surrounded by the sealant layer. In other words, the vicinity of a connection between the two inner conducting elements is encompassed by the sealant layer. The retaining jacket overlies this vicinity and substantially completely covers the sealant layer.

BRIEF DESCRIPTION OF THE DRAWINGS

The invention will now be further described by way of example only with reference to the accompanying drawings in which.

DETAILED DESCRIPTION OF THE EMBODIMENTS

Figure 1:
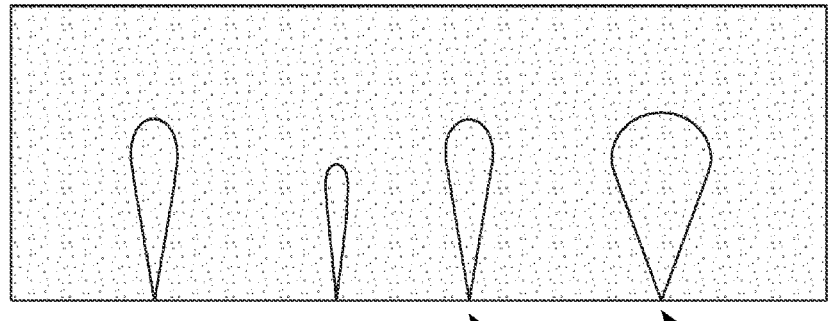
FIG. 1 is schematic view showing the approximate shape of voids formed in a sealing mastic subjected to air pressure.

Referring to FIG. 1 there is shown schematically generally teardrop shaped voids 2 which may be formed in a mastic that has been subjected to high air pressures.

Figure 2:
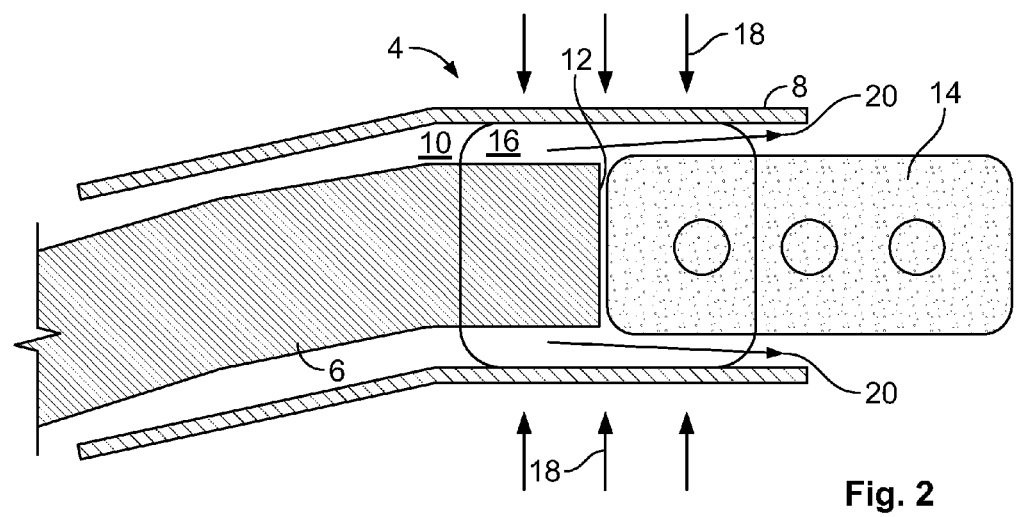
FIG. 2 is a schematic view of a known joint for a paper insulated lead cable (PILC)

Referring to FIG. 2 there is shown schematically a known joint 4 for a paper insulated lead cable (PILC). The paper insulation forming part of the PILC is impregnated with oil. The joint 4 comprises a first PILC 6 and a retaining jacket 8 having a hollow interior 10. The first PILC has an inner conducting element 12 that is conductively secured to an inner conducting element 12 (not shown) of a further cable 14. The joint 4 further comprises a sealant forming a sealant layer 16 within the hollow interior 10 of the retaining jacket 8.

The sealant layer 16 surrounds the vicinity of the joint 22 in which the inner conducting element 12 is connected to the inner conducting element 12 of the further cable 14 and the retaining jacket 18 overlies this vicinity.

The retaining jacket 18 may be made from any suitable material and could be in the form of, for example, an elastomeric tube, or a heat shrink tube or alternatively, the retaining jacket 18 may be formed from fabric tape.

The retaining jacket 8 is adapted to apply an inward pressure to the region of the joint 22 at which the two inner conducting elements form a connection. This inward pressure is indicated by arrows 18.

As mentioned hereinabove, a problem with known joints of this type is that in conditions where there is high oil pressure within the PILC 6, voids 32 of the types shown in FIG. 1 are formed in the sealant layer 16. These voids 32 create pathways indicated schematically by arrows 20 along which oil may pass from the PILC 6 and thus leak from the cable 6. Leakage of oil is undesirable for the reasons set out hereinabove.

Referring now to FIG. 3 to 10, embodiments of a joint 22 according to the present invention will now be described.

Referring initially to FIGS. 3 to 7, a joint according to a first embodiment of the present invention is designated generally by the reference numeral 22. Parts of the joint 22 which correspond to parts of the known joint 4 have been allocated corresponding reference numerals for ease of reference.

The joint 22 comprises retaining jacket 8 defining a hollow interior 10 and a sealant forming a sealant layer 16. The joint 22 thus comprises a first PILC 6, a retaining jacket 8 having a hollow interior 10, and a sealant forming a sealant layer 16 within the hollow interior 10 of the retaining jacket 8. In addition, the joint 22 comprises a retaining structure 24 positioned within the hollow interior 10 and formed within the sealant layer 16. The retaining structure 24 may take any desirable form and in this embodiment, is in the form of a grid 25. The retaining structure 24 serves to disrupt pathways of the type indicated by arrows 20 in FIG. 2 thereby retaining the oil pressure within the cable 6 and preventing oil from leaking from cable 6, or reducing any such leakages when compared with prior art joints.

Figure 3:
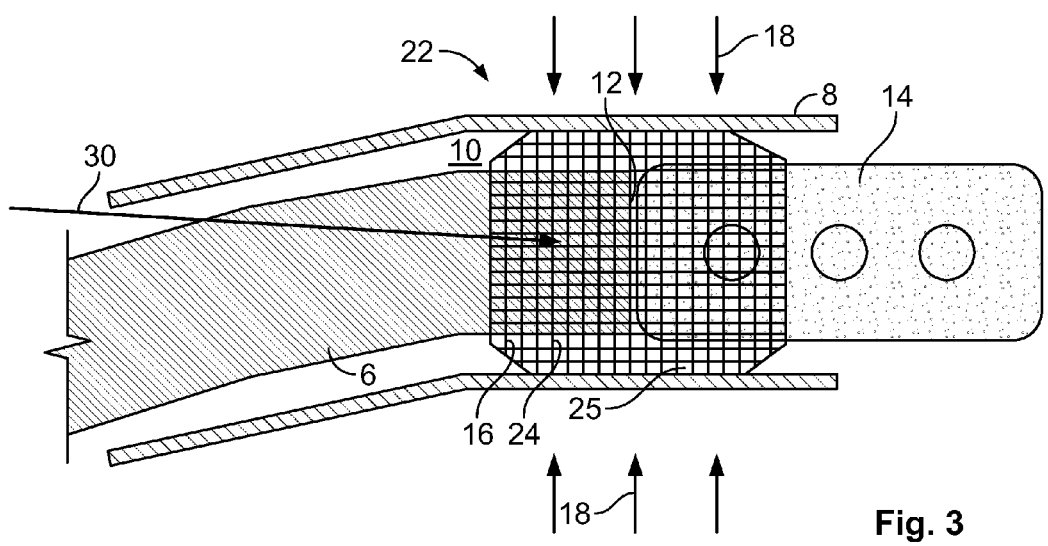
FIG. 3 is a schematic view of a joint according to the present invention.
Figure 4:
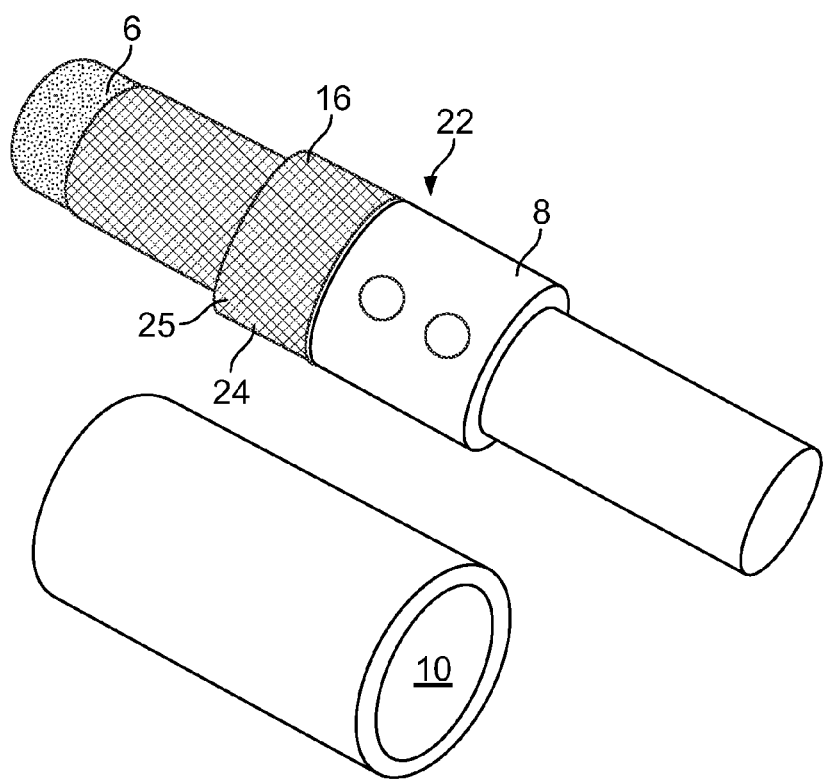
FIG. 4 is a schematic perspective view of the joint of FIG. 3 showing the retaining structure separate to the remainder of the joint.
Figure 5:
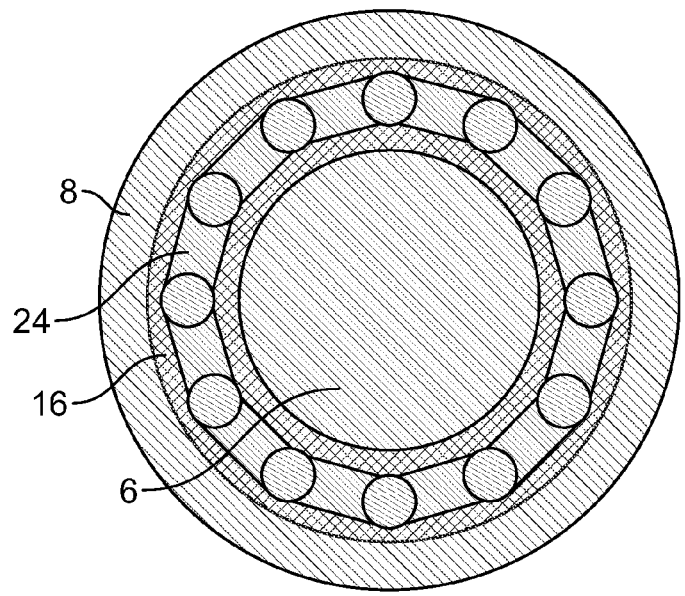
FIG. 5 is a cross-sectional view of the joint of FIG. 3 taken along line A-A.
Figure 6:
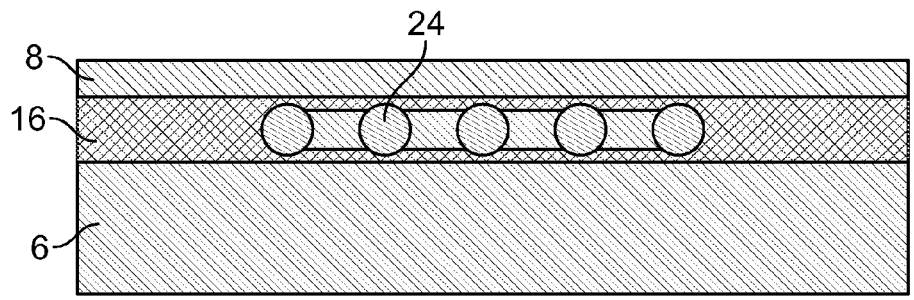
FIG. 6 is a cross-sectional view of the joint of FIG. 3 taken along line B-B.
Figure 7:
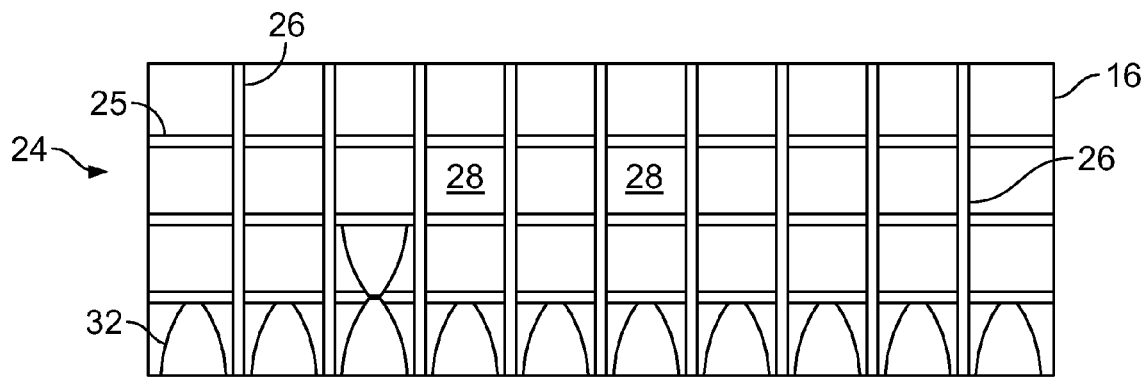
FIG. 7 is a schematic view of the retaining structure of the joint of FIG. 3.

The retaining structure 24 in the form of grid 25 is shown in more detail in FIG. 7. The grid 24 comprises strands 26 defining cells 28. In use, pressure caused by the oil within the cable 6 will act generally in the direction of arrow 30 (FIG. 3). This pressure will cause voids 32 (shown in FIG. 7) to form in the sealant layer 16. However, further propagation of voids 32 is prevented by the structure of the grid 24. If a cell 28 of the grid 25 is breached and a void 32 is able to continue to propagate, the void 32 will be contained within an adjacent cell 28.

The mesh or grid 24 may have any desirable dimensions but preferably each of the strands 26 has a diameter of between 0.5 to 1.5 mm, preferably 0.8 to 1.2 mm.

In addition, the grid 24 size will preferably be between 5 $mm^2$ and 25 $mm^2$. The grid size is however not critical, and the size of the grid 24 may vary depending on other prevailing factors.

The grid 24 must be designed such that strands 26 of the mesh do not overlap. This is because overlapping strands 26 can potentially provide a leakage path for oil. In other words, strands 26 of the grid 24 should not lie over, or under other strands 26 of the grid 24.

Figure 8:
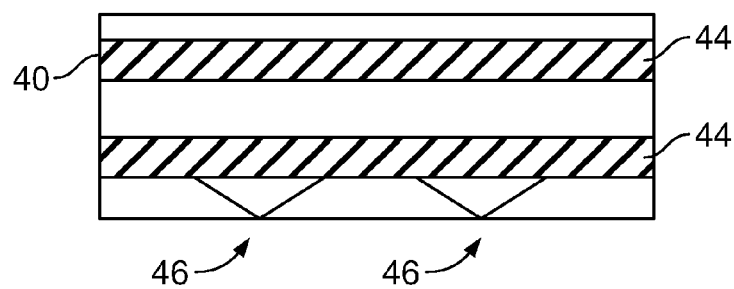
FIG. 8 is a schematic view of a retaining structure of joint according to a second embodiment of the present invention in which the retaining structure comprises two O-rings.
Figure 9:
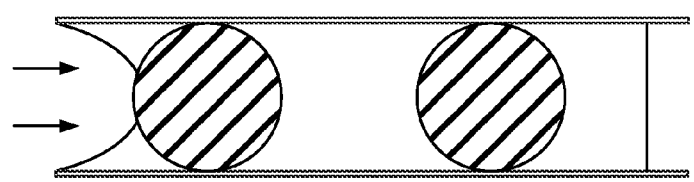
FIG. 9 is a further view of the retaining structure FIG. 8.

Turning now to FIGS. 8 and 9, a retaining structure 40 forming part of a joint 22 according to a second embodiment of the invention is illustrated schematically.

The retaining structure 40 is in the form of two O-rings 44 which are positioned in the sealant layer 16 forming part of the joint 22.

The O-rings may have any desirable dimensions, but in this embodiment each o-ring 44 has a thickness of between 0.5 to 5.0 mm, preferably 1.5 to 3.0 mm.

In use, pressure from oil within the cable 6 will act generally in the direction of arrows 46. This pressure will cause voids 32 to form in the sealant layer 16. However, each O-ring 44 acts as a dam preventing continuing propagation of the voids 48. This disrupts the formation of pathways by the voids 32 thus preventing oil from leaking from the cable 6.

In each of the described embodiments, the retaining structure 24 is preferably formed from a non-porous non-fibrous polymer adapted to within high temperatures for extended periods of time.

Suitable polymers for forming the retaining structure 24 are for example, polypropylene, nylon, and polyester, although many other polymers are also suitable.

The sealant layer 16 may be formed from any suitable mastic. A typical mastic formulation would be:

| Ingredient | Approximate Wt % |
| --- | --- |
| Epichlorhydrin | 40 |
| Nitrile Rubber | 10 |
| Tackifier | 30 |
| Filler | 5 |
| $AlOH_3$ | 10 |

-continued

| Ingredient | Approximate Wt % |
|---|---|
| Stabiliser | 0.5 |
| Antioxidant | 1 |

Figure 10:
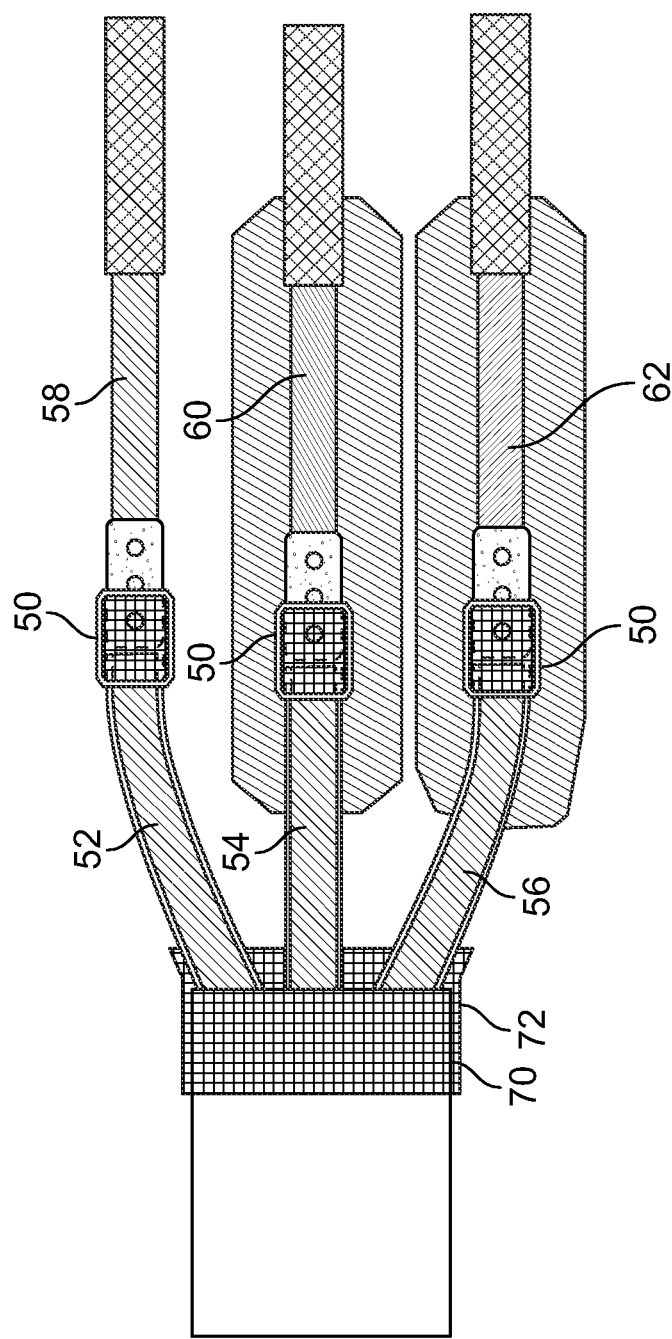
FIG. 10 is a schematic view showing typical application areas for the joint according to the present invention.

Turning now to FIG. 10, typical areas at which a joint including the retaining structure forming part of the present invention may be applied is shown.

A joint according to the present invention may be assembled in any convenient way. For example, the sealant may be applied in the form of layers of mastic which may be wound around the area to be protected for example a vicinity in which a first PILC 52 is to be conductively secured to a second PILC. A retaining structure in the form of, for example, the mesh, grid or O ring or rings may then be placed around the layers of mastic, and a further one or more layers of mastic may be applied over the top of the retaining structure. The elastic property of the mastic together with the pressured applied by outer layers of mastic force the mastic into the retaining structure, particularly when the retaining structure is in the form of a grid.

The joint and sealant retainer according to the present invention may be applied to any area of a PILC 6 in which a sealant may experience a high interior pressure.

Referring to FIG. 10, three joints according to the first aspect of the present invention are illustrated schematically and indicated by the reference numeral 50. Each of the joints is positioned at a location where a first PILC 52, 54, 56 is to be conductively secured to a further cable 58, 60, 62 the joint 50 is therefore of the type described herein above with reference to FIGS. 3 to 7.

FIG. 10 also schematically illustrates a sealant retainer 70 according to the second aspect of the present invention. The sealant retainer 70 is similar to the joints according to the first aspect of the invention and described herein above. However the sealant retainer 70 is positioned at a breakout region where the cores of a three core cable are separated into cables 52, 54, 56. A sealant is used to fill the gaps between the cores in the breakout region. The sealant retainer 70 comprises a retaining jacket 72 of the type described herein above with reference to the joint according to embodiments of the first aspect of the present invention.

The invention could also be applied to the termination of a PILC. In such a situation a sealant would be applied to the vicinity where the cable conductor inserts into a terminator "lug".

Although the invention is primarily directed towards providing a joint for a PILC, the invention is also suitable for use as a sealant retainer for a PILC, which sealant retainer may be located at a part of a PILC not necessarily forming a joint 22.

The retaining structure 24 may be rigid, although it could also be semi-rigid. This means that the retaining structure 24 is able to withstand high oil pressure such that it does not break or significantly deform under pressure, but is also sufficiently flexible so that it can surround the PILC 6.

Advantageously, the retaining structure 24 is heat resistant and is able to withstand temperatures of up to 110° C., but more typically, the retaining structure 24 will be subjected to temperatures within the range 60-70° C.

Conveniently, the retaining structure 24 is non-porous. This means that oil will be prevented from passing through the structure thus enhancing the effectiveness of the retaining structure 24 in preventing leakage of oil through the sealant layer 16.

The retaining structure 24 may take any suitable form, but advantageously the retaining structure 24 is in the form of a mesh or a grid 24. Hereinafter, the term "grid 24" will be used to refer to a grid 24 or a mesh or like structure.

The retaining structure 24 may comprise a plurality of grids spaced apart axially along the length of the retaining jacket 18. Alternatively, the retaining structure 24 may comprise a single grid 24 only.

Alternatively, the retaining structure 24 may comprise one or more O-rings spaced apart axially along the length of the retaining jacket 18.

Preferably, the, or each, 'O' ring is dimensioned such that tightly fits onto the, or each cable 6.

The retaining jacket 18 may be formed from any suitable material but preferably is formed from an elastomeric tube, such as a silicone, fluorosilicone, EPDM or similar material. Alternatively, the retaining jacket 18 may comprise a heat shrink tube utilizing a cross-linked polyethylene, fluorocarbon or similar material or may be formed from tape, such as a PVC tape, or fiber reinforced tape.

What is claimed is:

1. A joint for a paper-insulated lead covered cable (PILC) including paper insulation impregnated with oil, the joint comprising:
   a first PILC and a retaining jacket having a hollow interior, the first PILC having an inner conducting element that is conductively secured to an inner conducting element of a further cable within the hollow interior of the retaining jacket;
   a sealant forming a sealant layer within the hollow interior of the retaining jacket; and
   a retaining structure positioned within the sealant layer and comprising an O-ring.

2. A joint according to claim 1 wherein the retaining structure is rigid.

3. A joint according to claim 1 wherein the retaining structure is non-porous.

4. A joint according to claim 1 wherein the retaining structure is non-fibrous.

5. A joint according to claim 1 wherein the retaining structure comprises a grid.

6. A joint according to claim 1 wherein the retaining jacket comprises an elastomeric tube.

7. A joint according to claim 6 wherein the retaining jacket comprises a heat shrink tube.

8. A joint for a paper-insulated lead covered cable (PILC) including paper insulation impregnated with oil, the joint comprising:
   a first PILC and a retaining jacket being formed from tape and having a hollow interior, the first PILC having an inner conducting element that is conductively secured to an inner conducting element of a further cable within the hollow interior of the retaining jacket;
   a sealant forming a sealant layer within the hollow interior of the retaining jacket; and
   a retaining structure positioned within the sealant layer.

9. A joint according to claim 8 wherein the retaining structure is rigid.

10. A joint according to claim 8 wherein the retaining structure is non-porous.

11. A joint according to claim 8 wherein the retaining structure is non-fibrous.

12. A joint according to claim 8 wherein the retaining structure comprises a grid.

13. A sealant retainer for a paper-insulated lead covered cable (PILC) including paper insulation impregnated with oil, comprising:

a first PILC and a retaining jacket having a hollow interior, the first PILC having an inner conducting element positioned within the hollow interior of the retaining jacket;

a sealant forming a sealant layer within the hollow interior of the retaining jacket; and, a retaining structure comprising an O-ring formed within the sealant layer.

14. A sealant retainer according to claim 13 wherein the retaining jacket comprises an elastomeric tube.

15. A sealant retainer according to claim 13 wherein the retaining jacket comprises a heat shrink tube.

16. A method of forming a joint for a PILC, the method comprising the steps of:

conductively securing an inner conducting element of a PILC to an inner conducting element of a further cable;

applying a layer of sealant having a retaining structure within the sealant over both conducting elements;

positioning the retaining structure of the layer of sealant around both of the inner conductor elements; and positioning a retaining jacket over the conducting element of the PILC and the further cable so as to enclose the respective inner conducting elements the sealant and the retaining structure.

\* \* \* \* \*